Figure 14:
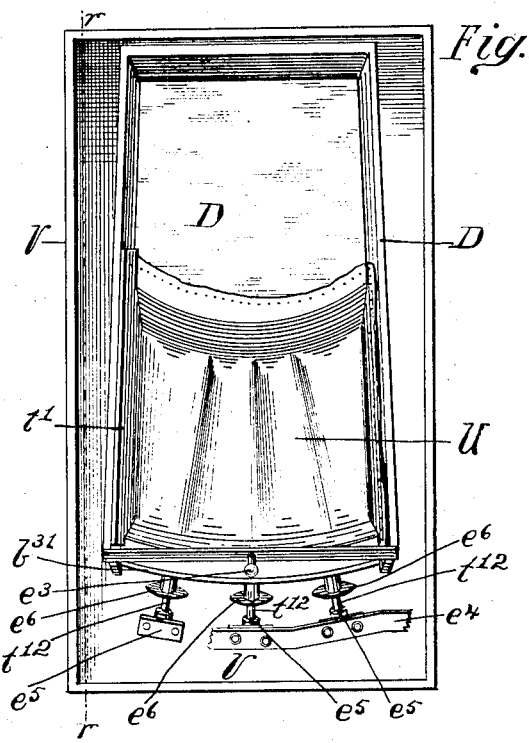

No. 849,553. PATENTED APR. 9, 1907.
C. O. MICHAELSEN.
MACHINE FOR SEPARATING GOLD AND PLATINUM FROM OTHER MATERIAL.
APPLICATION FILED FEB. 14, 1905.
11 SHEETS—SHEET 1.
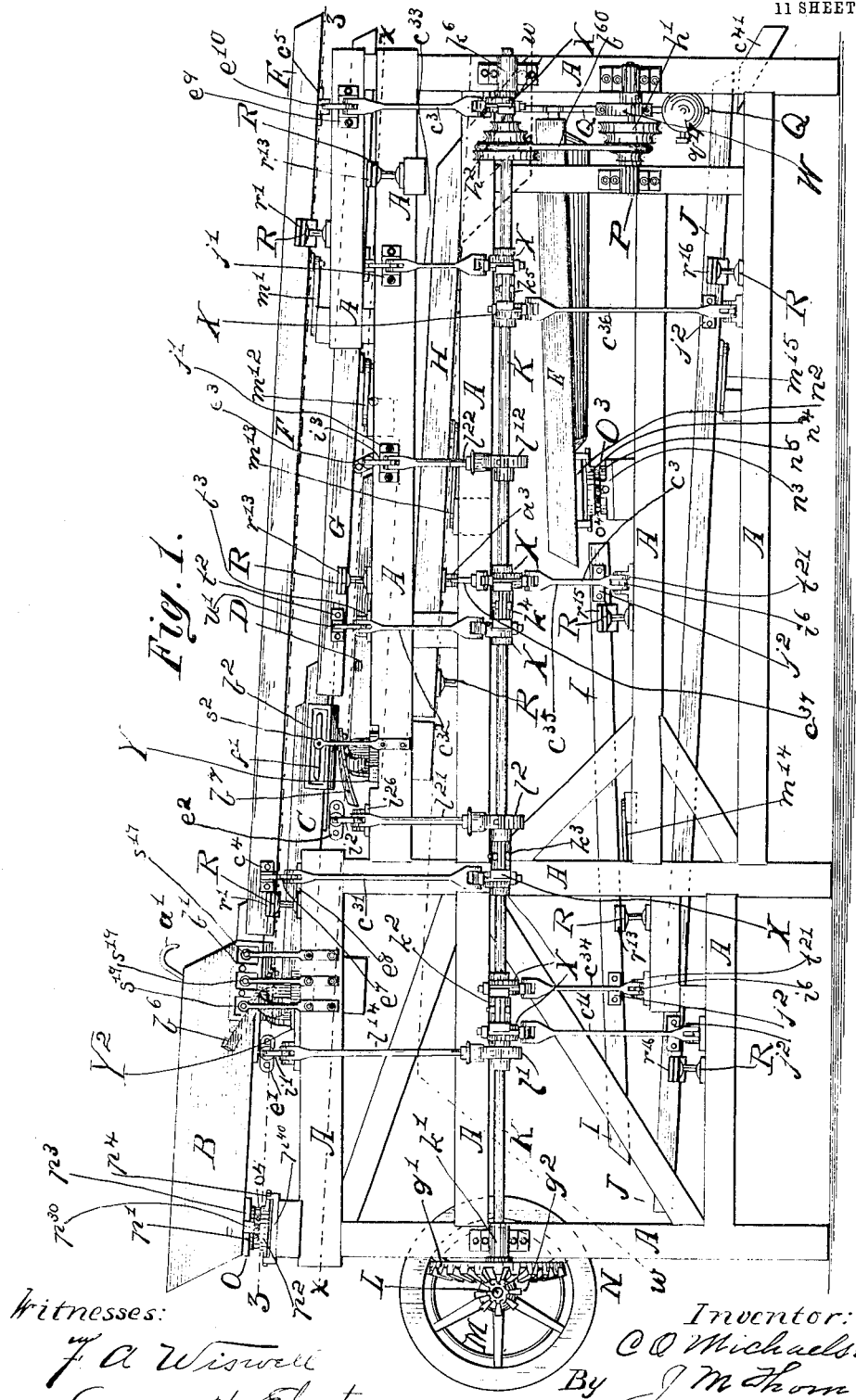
Witnesses:
F. A. Wiswell
George H. Ebert
Inventor:
C. O. Michaelsen
By J. M. Thomas
Attorney.

No. 849,553. PATENTED APR. 9, 1907.
C. O. MICHAELSEN.
MACHINE FOR SEPARATING GOLD AND PLATINUM FROM OTHER MATERIAL.
APPLICATION FILED FEB. 14, 1905.
11 SHEETS—SHEET 2.
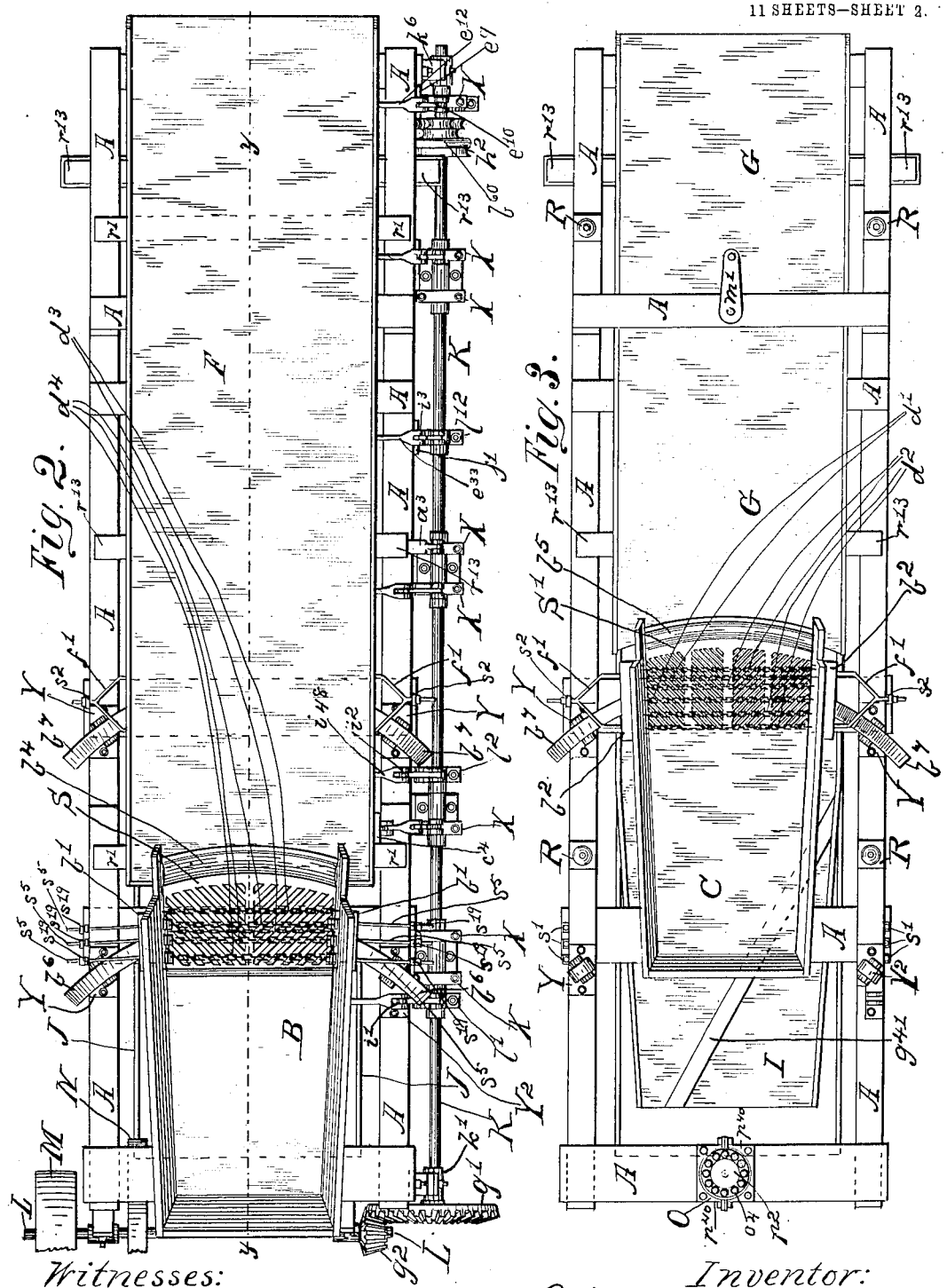
Witnesses:
F. A. Wiswell.
George W. Ebert.
Inventor:
C. O. Michaelsen
By J. M. Thomas, Attorney.

No. 849,553. PATENTED APR. 9, 1907.
C. O. MICHAELSEN.
MACHINE FOR SEPARATING GOLD AND PLATINUM FROM OTHER MATERIAL.
APPLICATION FILED FEB. 14, 1905.
11 SHEETS—SHEET 3.
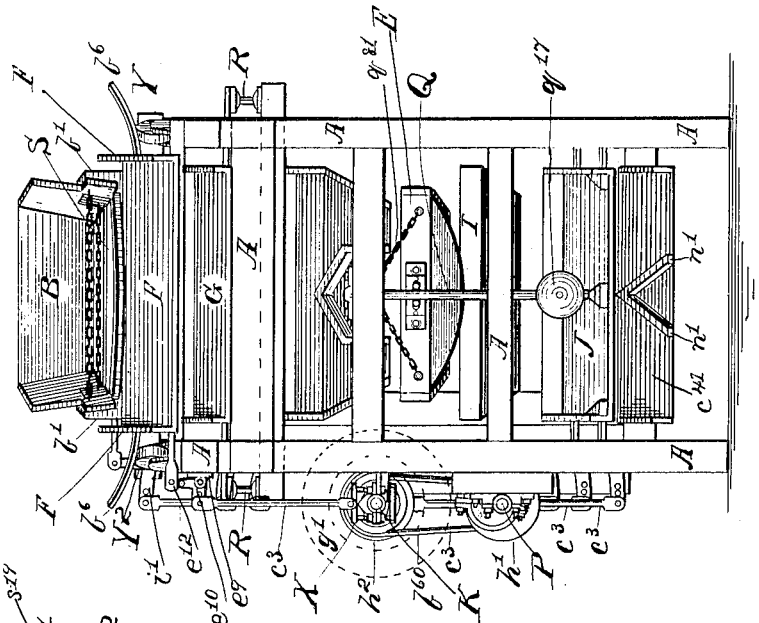
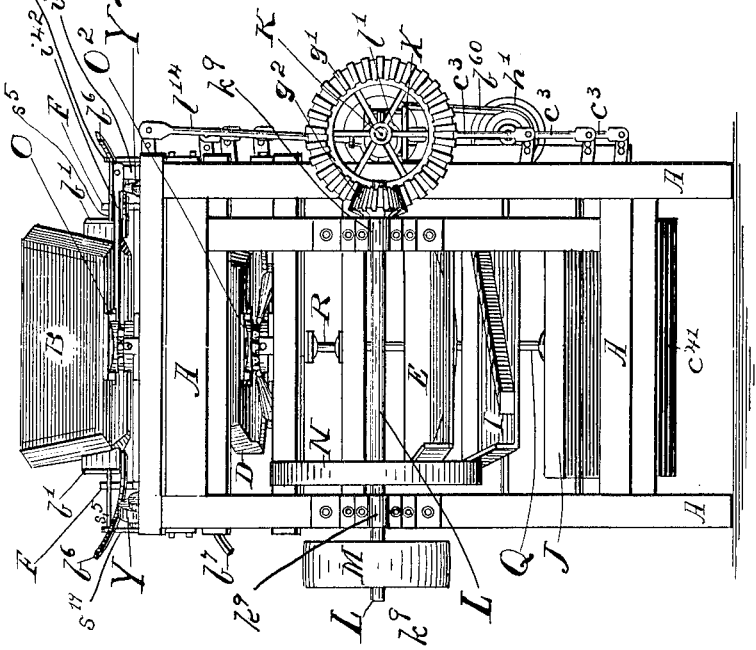
Witnesses:
J. A. Wiswell.
George W. Ebert.
Inventor:
C. O. Michaelsen
By J. M. Thomas
Attorney.

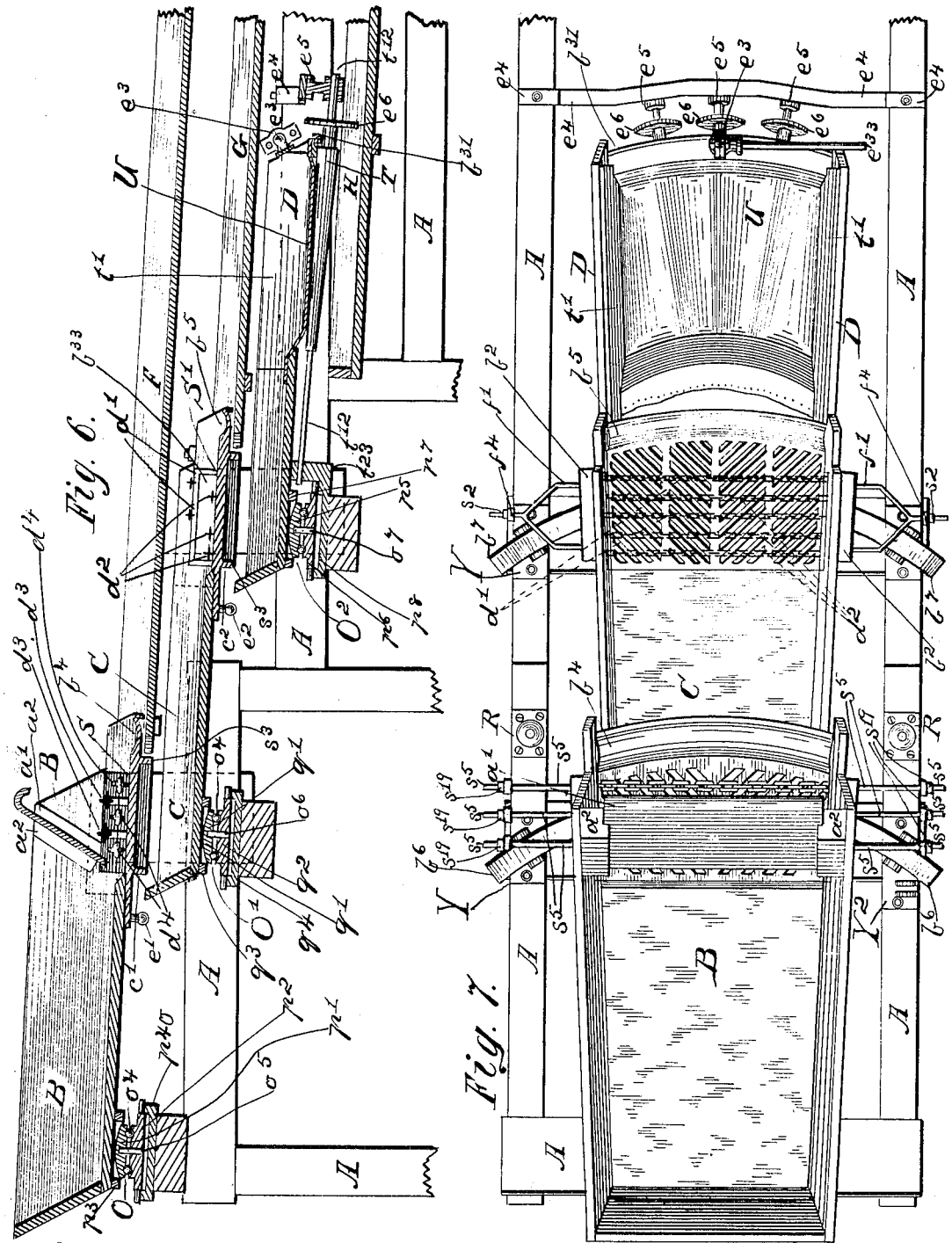

No. 849,553. PATENTED APR. 9, 1907.
C. O. MICHAELSEN.
MACHINE FOR SEPARATING GOLD AND PLATINUM FROM OTHER MATERIAL.
APPLICATION FILED FEB. 14, 1905.
11 SHEETS—SHEET 5.
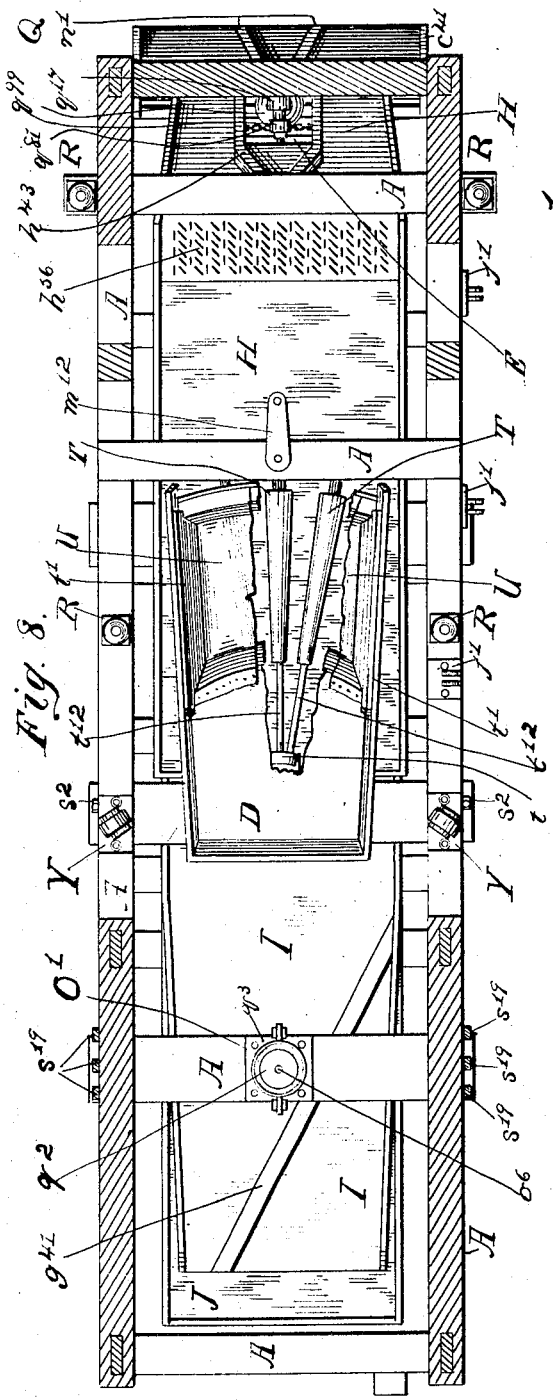
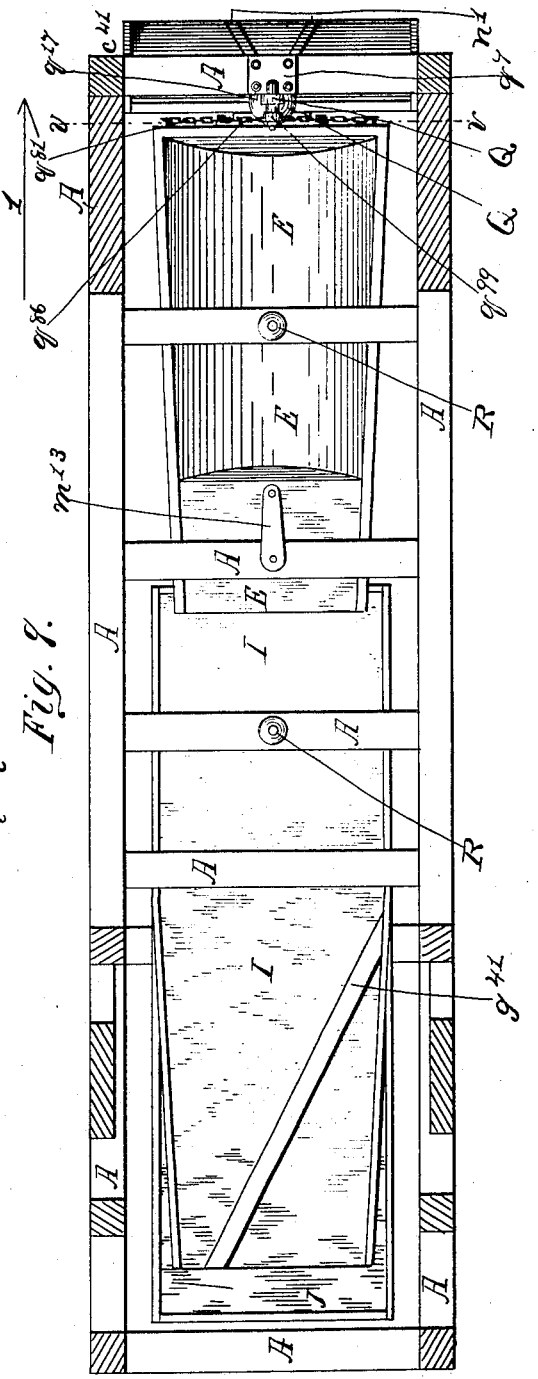
Witnesses:
Inventor:
C. O. Michaelsen
By J. M. Thomas
Attorney No. 849,553. PATENTED APR. 9, 1907.
C. O. MICHAELSEN.
MACHINE FOR SEPARATING GOLD AND PLATINUM FROM OTHER MATERIAL.
APPLICATION FILED FEB. 14, 1905.
11 SHEETS—SHEET 6.
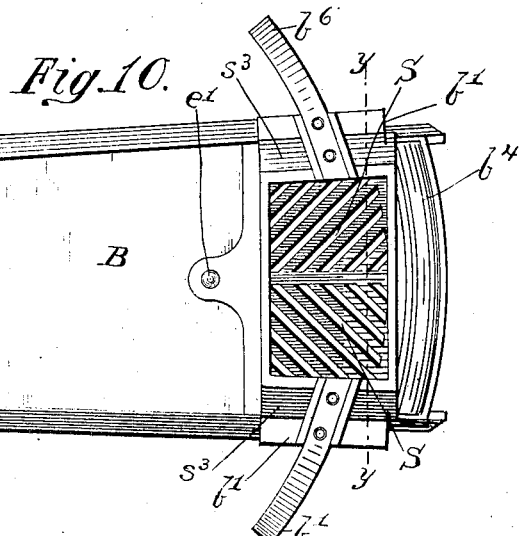
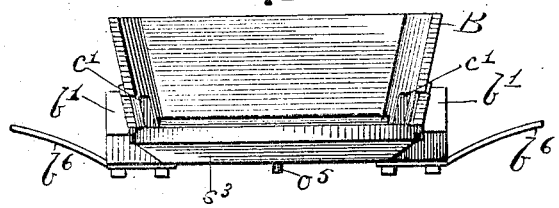
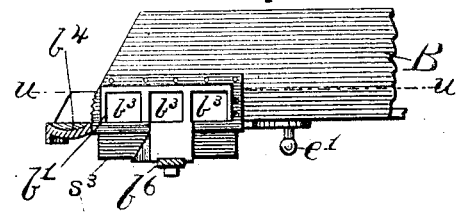
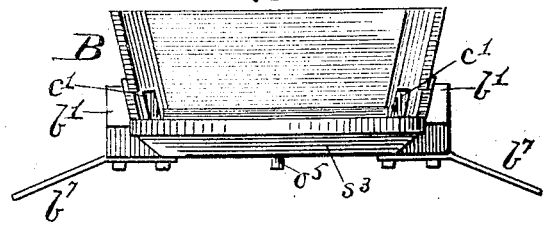
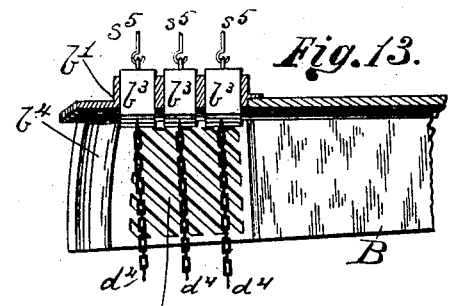
Witnesses:
F. A. Wiswell.
Geo. B. Ebert.
Inventor:
C O Michaelsen
By J M Thomas
Attorney.

No 849,553. PATENTED APR. 9, 1907.
C. O. MICHAELSEN.
MACHINE FOR SEPARATING GOLD AND PLATINUM FROM OTHER MATERIAL.
APPLICATION FILED FEB. 14, 1905.
11 SHEETS—SHEET 7.

Witnesses:
F. A. Wiswell
Geo. H. Ebert

Inventor:
C. O. Michaelsen
By J. M. Thomas
Attorney.

No. 849,553. PATENTED APR. 9, 1907.
C. O. MICHAELSEN.
MACHINE FOR SEPARATING GOLD AND PLATINUM FROM OTHER MATERIAL.
APPLICATION FILED FEB. 14, 1905.
11 SHEETS—SHEET 8.
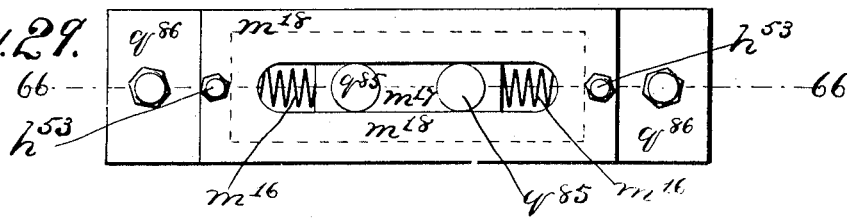
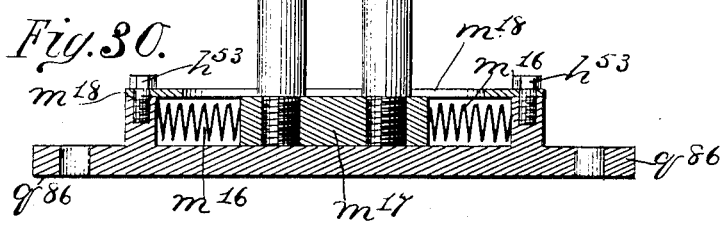
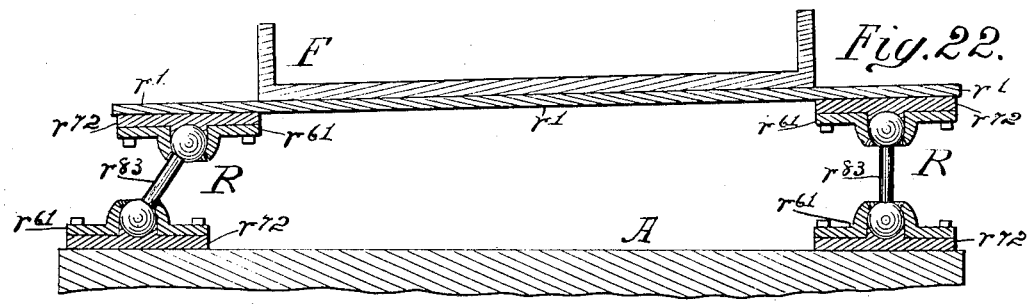
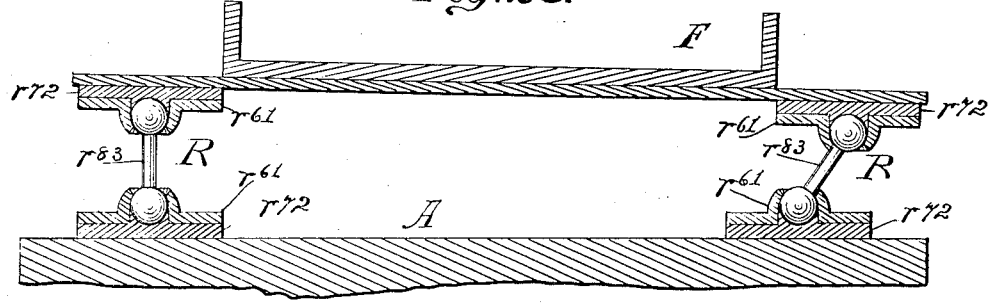
Witnesses:
Inventor:
C. O. Michaelsen
By J. M. Thomas
Attorney.

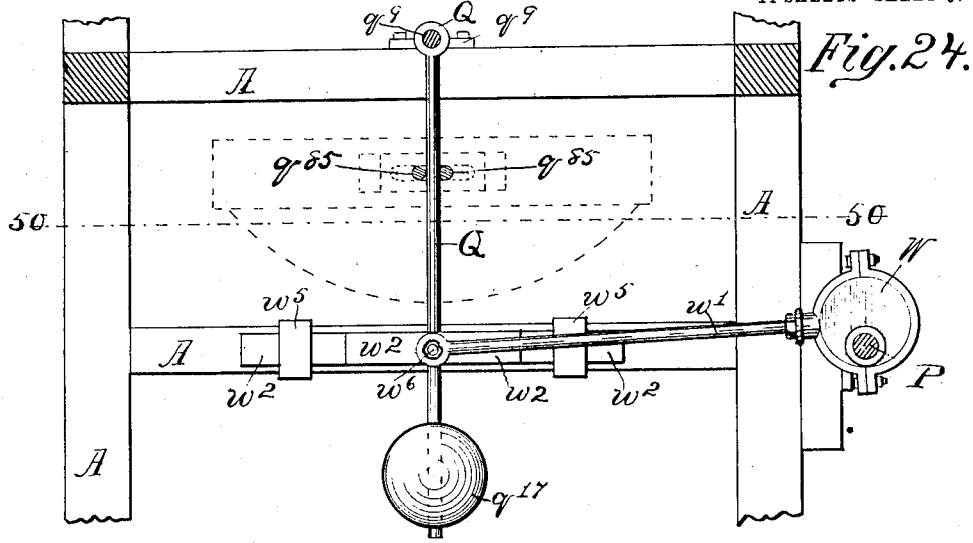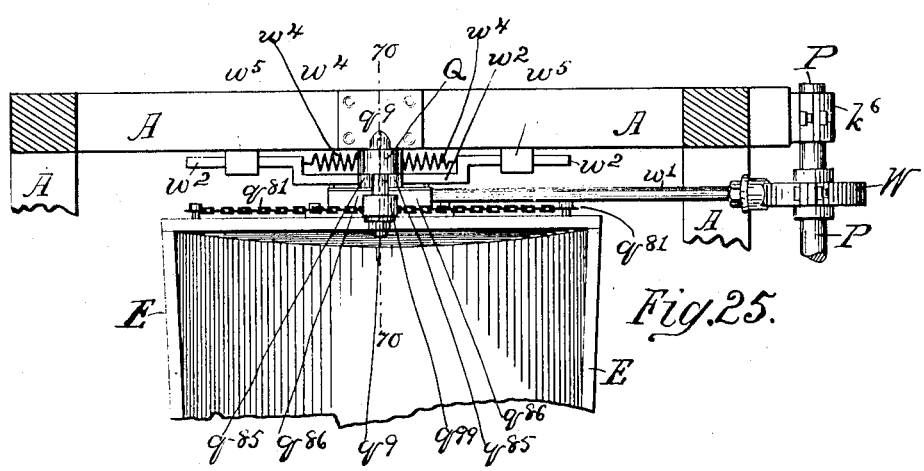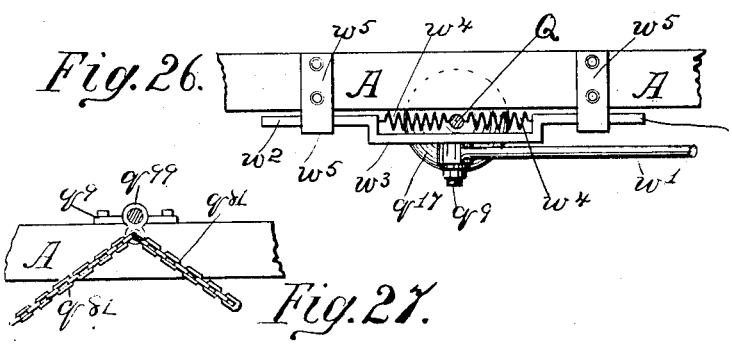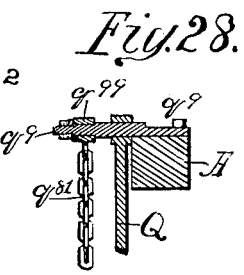

No. 849,553. PATENTED APR. 9, 1907.
C. O. MICHAELSEN.
MACHINE FOR SEPARATING GOLD AND PLATINUM FROM OTHER MATERIAL.
APPLICATION FILED FEB. 14, 1905.
11 SHEETS—SHEET 10.
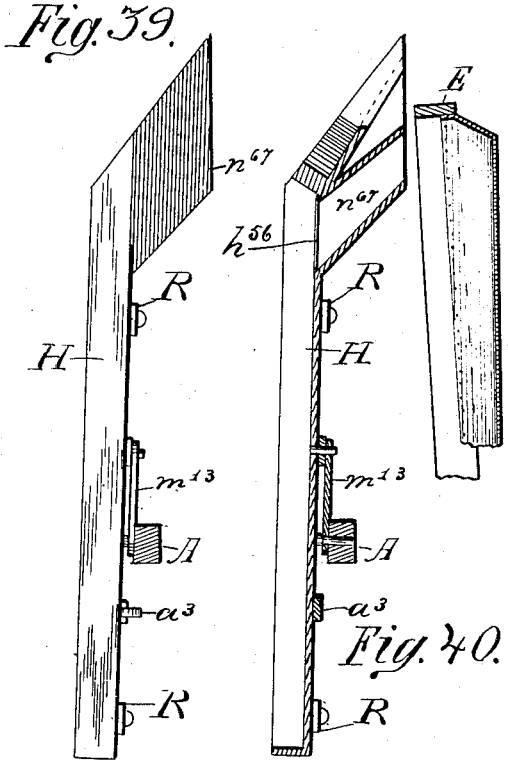
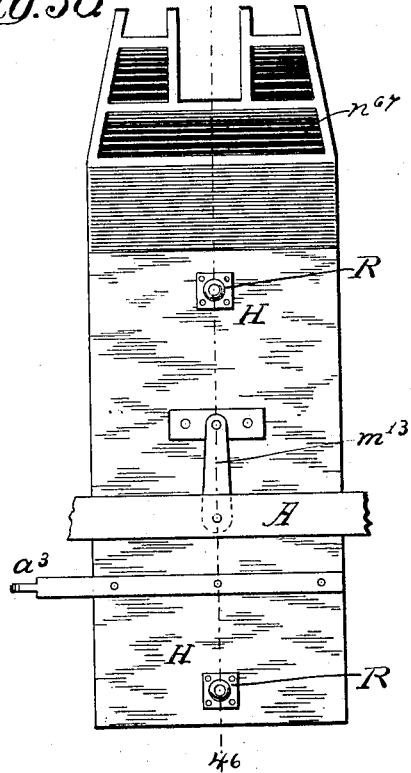
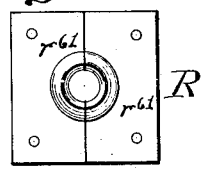
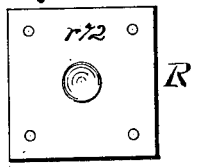
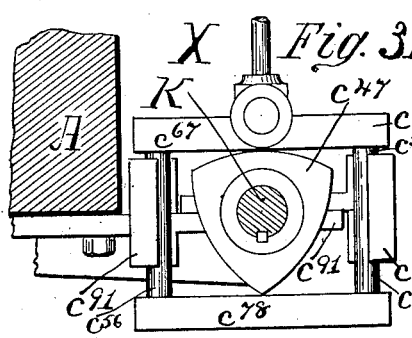
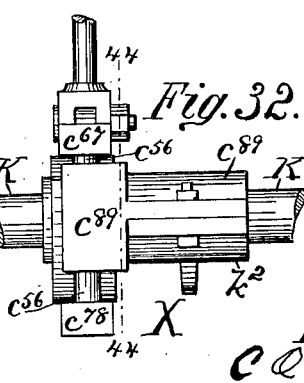
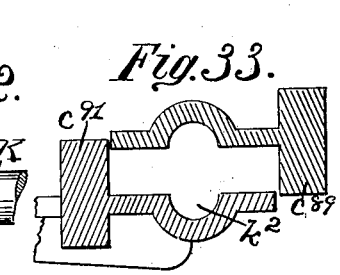

UNITED STATES PATENT OFFICE.

CHARLES O MICHAELSEN, OF SALT LAKE CITY, UTAH.

MACHINE FOR SEPARATING GOLD AND PLATINUM FROM OTHER MATERIAL.

No. 849,553. Specification of Letters Patent. Patented April 9, 1907.

Application filed February 14, 1905. Serial No. 245,616.

*To all whom it may concern:*

Be it known that I, CHARLES O. MICHAELSEN, a citizen of the United States, residing at Salt Lake City, in the county of Salt Lake and State of Utah, have invented a new and useful Machine for Separating Gold and Platinum from other Material, of which the following is a specification.

My invention relates to machines for winning gold and platinum from its associated clay, gravel, or gangue, and has for its object the complete elimination and saving of coarse gold, fine gold, flour-gold, as well as platinum-dust, from gangue and other mineral-bearing material and the final concentration of other metallic values by a series of operations in one machine; and it consists, first, in a series of rocker-boxes that can be made to operate similar to the old and well-known "rocker," with the additional feature of capability of adjustment to describe either anticlinal or synclinal arcs; second, in resiliently-stationary chains arranged immediately over the grating of a rocker-box at right angles thereto, with other chains adjacent, but secured to and vibrating with, the oscillatory rocker-box to which they are attached, the "sawing" action so produced disintegrating lumps of clay or gravel, but permitting stones larger than the openings of the grating to pass over and to waste; third, in a ball-bearing support near one end of each rocker-box, the ball-bearings so pivoted as to permit movement in any desired direction; fourth, in a laterally-oscillating box whose bottom is of flexible material and resting on cone-rollers radiating from the center of the ball-bearings, supporting one end of the said box; fifth, in an amalgamating-pan whose receiving end is supported by chains and that partakes of the motion of a pendulum, the discharge end of the said pan being supported by ball-bearings of similar make to those already mentioned; sixth, in a concentrating-table mounted on and supported by "dumb-bell" pins whose ends are ball-and-socket joints, the bases being adjustable, so that the dumb-bell pins of one side can be made to stand vertical, while those of the other side stand inclined, whereby when the table is made to vibrate laterally one edge will dip, while the other side will rise, &c. I attain these objects by the mechanism illustrated in the accompanying drawings, in which similar characters of reference indicate like parts throughout the several figures.

Figure 15:
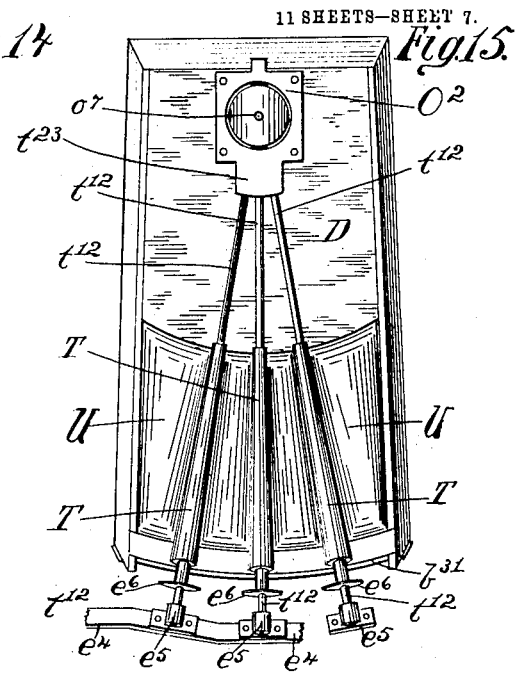
Figure 16:
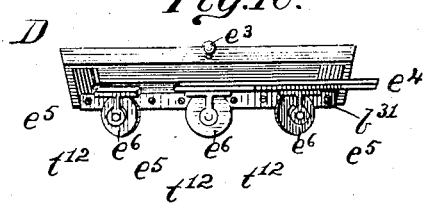
Figure 17:
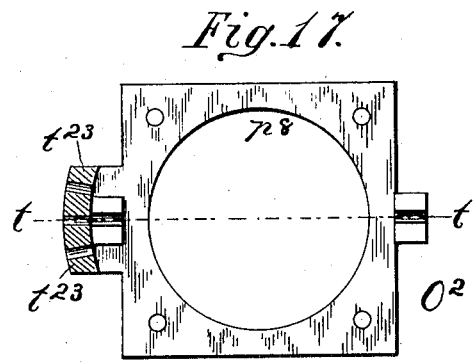
Figure 18:
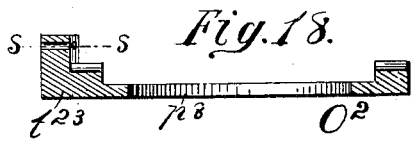
Figure 19:
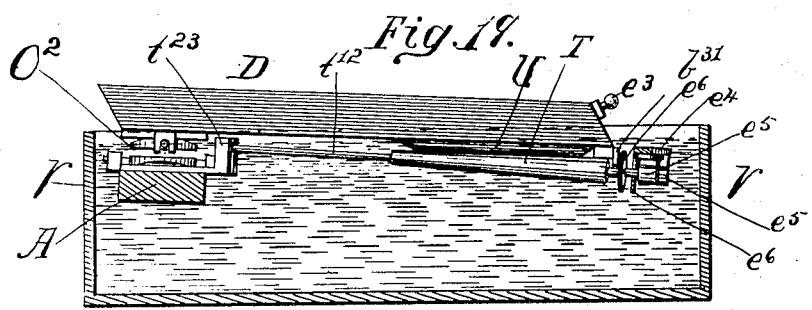
Figure 41:
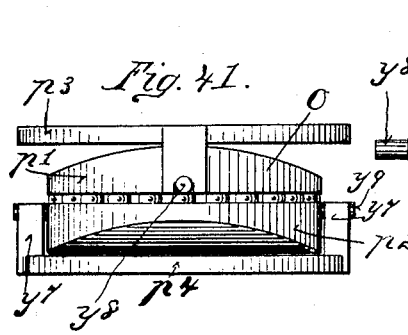
Figure 42:
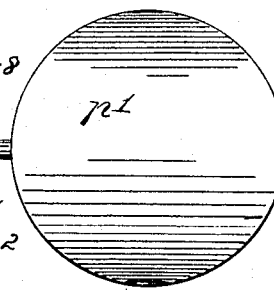
Figure 43:
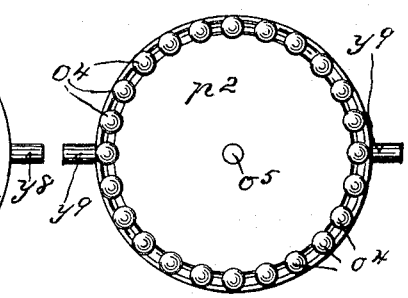
Figure 44:
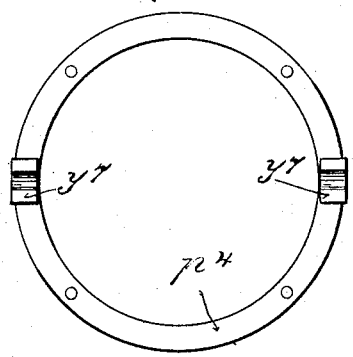
Figure 47:
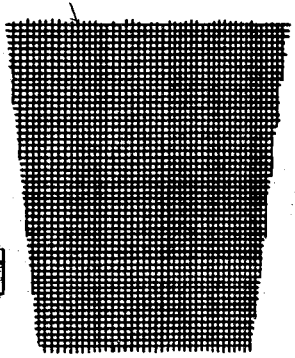
Figure 45:
Figure 46:
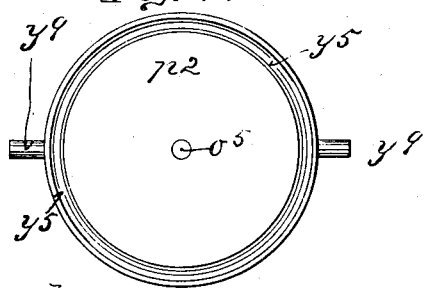
Figure 48:
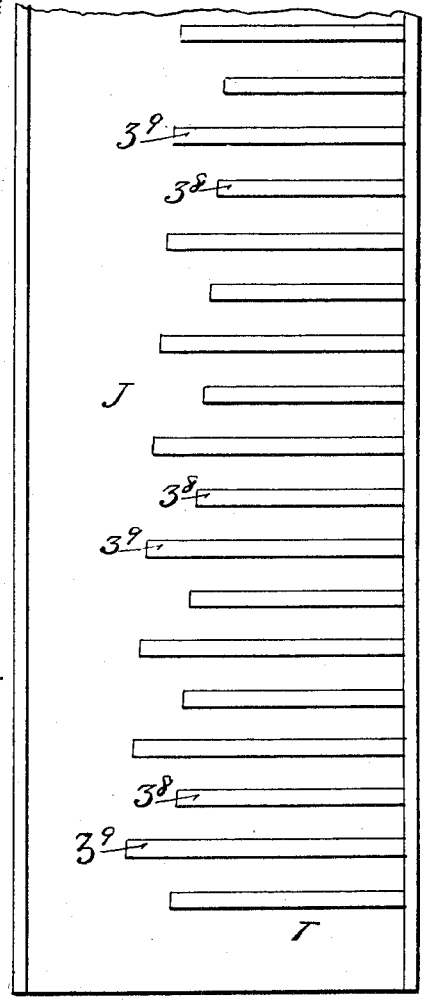

Figure 1 is a side elevation of my invention. Fig. 2 is a plan view of the same. Fig. 3 is a top view of certain parts below the line $z\,z$ on Fig. 1. Fig. 4 is a front end elevation, and Fig. 5 is a rear end elevation, of the same. Fig. 6 is an enlarged vertical section, through the longitudinal middle of a part of the forward portion of the machine. Fig. 7 is a similarly-enlarged top view of a part of the forward portion of the machine with the first two conveyer-chutes removed. Fig. 8 is a top view of certain parts below the line $xx$ on Fig. 1, parts being shown as broken away to show parts below. Fig. 9 is a top view of certain parts below the line $w\,w$ on Fig. 1. Fig. 10 is an enlarged bottom view of one of the rocker-boxes B or C. Fig. 11 is a similarly-enlarged rear end view of Fig. 10. Fig. 12 is a detail of the casting forming the delivery end of rocker-box B or C. Fig. 13 is a top view of a portion of Fig. 12 below line $u\,u$ Fig. 12. Fig. 14 is a top view of the flexible-bottomed box D, arranged to operate within a tank. Fig. 15 is a bottom view of the flexible-bottomed box D showing the relative positions of the ball-bearing $O^2$ and cone-rollers T. Fig. 16 is a rear end view of the flexible-bottomed box D, showing the relative positions of the cone-rollers thereto. Fig. 17 is an enlarged top view of the base-plate that supports the ball-bearing $O^2$ and converging ends of the cone-rollers T below line $s\,s$ on Fig. 18. Fig. 18 is a vertical longitudinal section of Fig. 17. Fig. 19 is a side elevation of the flexible-bottomed box D, the tank V being shown in vertical longitudinal section on line $r\,r$, Fig. 14. Fig. 20 is a rear end view of rocker-box B or C, showing the supporting-arcs $b^7$ inclined downwardly from their fastenings. Fig. 21 represents a detail of the rocker-box B or C with one of the supporting-arcs declined downwardly and the opposite arc inclined upwardly from their fastenings. Fig. 22 is a vertical transverse section through a pair of the dumb-bell supports R of the conveyer-chute F, showing one of the positions that may be assumed by the said conveyer-chute F when the base-plates $r^{72}$ of the said pair of dumb-bell supports R are secured on the frame A farther apart than are their respective cap-plates $r^{72}$ secured to the under part of the said conveyer-chute F. Fig. 23 is a vertical transverse section through a pair of the dumb-bell supports R of the conveyer-chute F, showing one of the positions that can be assumed by it when the base-plates $r^{72}$ of the said pair of dumb-bell supports R are placed a less distance apart than are their respective cap-plates $r^{72}$. Fig. 24 is an enlarged detail view of the pendulum movement looking in the direction of arrow 1, Fig. 9, from line $v\,v$. Fig. 25 is an enlarged detail top view of Fig. 24, showing the pendulum Q and its connections. Fig. 26 is an enlarged detail, top view below line 50 50, Fig. 24, of the pendulum Q and its connections. Fig. 27 is an enlarged detail rear end view of the chain supporting the free end of the amalgamating-pan E. Fig. 28 is an enlarged detail, in vertical section, on line 70 70, Fig. 25, of the supporting-chain to the amalgamating-pan E, the pivoted end of the pendulum Q, and their supporting-stud $q^9$. Fig. 29 is an enlarged rear end view of the buffer $q^{86}$. Fig. 30 is an enlarged longitudinal section of the buffer $q^{86}$ on line 66 66, Fig. 29. Fig. 31 is an enlarged detail end view of one of the three-way cam devices X. Fig. 32 is an enlarged detail side view of the same. Fig. 33 is an enlarged detail section on line 44 44, Fig. 32, of the upper and lower bearing-plates separated, being parts of the three-way cam mechanism. Fig. 34 is an enlarged plan view of one of the base-plates or cap-plates of one of the dumb-bell supports R. Fig. 35 is an enlarged plan view of one of the base or cap plates $r^{72}$ of the dumb-bell supports R with one of the superposed half-plates $r^{61}$ in place. Fig. 36 is an enlarged plan view of one of the half-plates $r^{61}$ detached. Fig. 37 is a plan view of one of the base or cap plates with the half-plates $r^{61}$ in place. Fig. 38 is a bottom view of the separating-table H, showing the dumb-bell support (R) cap-plates placed at the longitudinal middle of the said table H. Fig. 39 is a side elevation of the separating-table H. Fig. 40 is a longitudinal section of the separating-table H, taken on the line 46 46, Fig. 38. Fig. 41 is a detail side elevation of a gimbal-bearing O. Fig. 42 is a detail top view of a trunnioned-ball track-plate. Fig. 43 is a detail top view of a trunnioned-ball track-plate, showing balls $o^4$ in the annular groove $y^5$. Fig. 44 is a detail top view of a bearing-frame. Fig. 45 is a detail side view of a trunnioned-ball track-plate. Fig. 46 is a detail top view of a trunnioned-ball track-plate, showing the annular groove $y^5$ without the balls $o^4$. Fig. 47 shows a detail view of a piece of matting $m^{73}$. Fig. 48 represents a part of the table J fitted with riffles of varying lengths.

The frame A carries secured thereto or in working connection therewith the various parts and combination of parts hereinafter fully described.

Mounted in journal-bearings $k^9$, secured to the front end of the frame A, is the driving-shaft L, carrying secured thereto the driving-pulley M and balance-wheel N. Firmly secured to one end of the said driving-shaft L is a bevel-pinion $g^2$, whose teeth intermesh with those of a bevel gear-wheel $g'$, which is secured to a shaft K, mounted and working in bearings $k'\ k^2\ k^3\ k^4\ k^5\ k^6$, secured to one side of the frame A.

At suitable points on the shaft K are secured eccentrics $l'\ l^2\ l^{12}$, each performing duties hereinafter set forth. At other suitable points on the said shaft K are mounted and secured a number of three-way cam devices X, each performing similar duties of agitation of certain parts of the machine, more fully hereinafter explained. The said shaft K also carries secured thereto, near its rearward end, a step-cone pulley $h^2$, embracing, by means of the belt $b^{60}$, a similar but reversely step-coned pulley $h'$, secured on the counter-shaft P, journaled in bearings secured to the frame A. The said counter-shaft P carries secured thereon an eccentric W, whose office will presently be described.

Describing the various metal-saving devices in the order of descent, this being the path of the more valuable parts of an ore under treatment, the rocker-box B is supported at three points upon devices secured to the frame A. To the under side of the said rocker-box B, near its forward end, transversely midway, is secured the cap-plate $p^3$ of the ball-bearing O. The said cap-plate $p^3$ is provided on opposite sides with downwardly-projecting blocks $p^{30}\ p^{30}$, which are made to serve as half-box bearings resting on corresponding trunnions projecting laterally from the ball-bearing cap $p'$, which on its under surface is circularly grooved, that serves as guide and track for a series of balls $o^4$, upon which the said bearing-cap $p'$ rests, the said balls $o^4$ being supported by a bearing-block $p^2$, similar in construction to the said bearing-cap $p'$, but presenting its reverse side up, while its oppositely-projecting trunnions are disposed at right angles to those of the bearing-cap $p'$. The base-plate $p^{40}$ is similar in construction to the cap-plate $p^3$, but its opposing upwardly-projecting half-boxes are disposed at right angles to the half-boxes on the said cap-plates $p^3$. The said base-plate $p^{40}$ is secured to a cross-beam of the frame A, and as a further security to prevent displacement of the parts comprising the ball-bearing O a king-pin $o^5$ is provided and centrally secured to either the bearing-cap $p'$ or to the bearing-block $p^2$. This construction of ball-bearing support permits the rocker-box B to tip in any direction while it is at the same time describing an arc with its free rear end, to which a variety of motions, suitable to the character of ore under treatment, may be imparted by the adjustment and arrangement of parts now to be described.

The rocker-box B may be made less in width at its forward end than at its rear end, as shown, the rear end being preferably a casting to which the sides and bottom of the said rocker-box B are secured. An extension of the medial plate of the said casting toward the forward end of the said rocker-box B and on which the floor of the said rocker-box B rests carries, projecting downward from its under side, a stud terminating in a spherical end $e'$, which forms the inclosed part of a ball-and-socket joint, which by means of the connecting-rod $i^{42}$, connected and pivoted to the vertical angle of the bell-crank lever $i'$, pivoted to an ear-plate that is an extension of the roller-plate $y^2$, the lateral angle of the said bell-crank lever pivoted to the vertical connecting-rod $l^{14}$, whose lower extremity is secured to the strap inclosing the eccentric $l'$ on the shaft K, through which system of connecting-rods, bell-crank lever, and ball-and-socket joint motion is conveyed from the shaft K to the said rocker-box B. Diagonally-disposed grating S constitutes the floor of the said casting, immediately beneath which and surrounding the same is a box-chute $s^3$, contracted at two opposite sides in order to insure the delivery of all of the passing "pulp" within the rocker-box C next below. Secured to bosses that are downward extensions of the guide-boxes $b'$, one each side of the said box-chute $s^3$, are secured the arcs $b^6$, whose radial point is the vertical center of the ball-bearing O. These arcs $b^6$ each rest on a roller-bearing Y Y$^2$, secured to the top of frame A, the axes of the rollers of the said roller-bearings Y or Y$^2$ being radial with the king-pin $o^5$ of the ball-bearing O. The base-plate of the roller-bearing Y$^2$ is extended forward and furnished with ears, within which is pivoted the bell-crank lever $i'$. The arcs $b^6$ may be given any desired angle from the horizontal, with the result that when the free end of the rocker-box B is laterally actuated through the ball-and-socket joint $e'$ and its connections the free end of the said rocker-box B will be moved in conformity with whatever angle is possessed by the arcs $b^6$, an upward angle of the said arcs $b^6$ imparting to the free end of the said rocker box B a synclinal motion, a downward angle of the said arcs $b^6$ giving the free end of the said rocker-box B an anticlinal motion, and by attaching arcs $b^6$, one possessing an upward the other an equal downward angle, the rocker-box B will be maintained transversely horizontal; but the lateral movement of the free end of the said rocker-box B will be up and down an inclined plane, thus imitating some of the movements of a miner's pan in skilful hands.

Operating within two guide-boxes $b'$, one on each side of the rocker-box B, are blocks $b^3$ of wood, rawhide, or other suitable material, to the inner ends of which are secured chains $d^4$, which are maintained taut by means of springs $s^{19}$, attached, one for each block $b^3$, to the adjoining side of the frame A and connected by a threaded nut and tension-rod $s^5$, one each of the said tension-rods $s^5$ being suitably connected to one each of the outer ends of the said block $b^3$, thus making each chain $d^4$ independent in action of the adjacent chain $d^4$. This construction permits a rocking, a lateral, or other desired movement of the rocker-box B without unduly straining any of the connected operating parts. In near proximity to the said chain $d^4$ are other chains $d^3$, preferably arranged a little above and between the resilient chains $d^4$, these said chains $d^3$ being secured to the inner sides of the rocker-box B in such a manner that the said chains $d^3$ partake of all the movements of the part of the rocker-box B to which the said chains $d^3$ are attached. This arrangement of chains $d^3$ and $d^4$ permits of a sawing action between the two sets of chains $d^3$ and $d^4$, as well as a "shearing" action between the resilient stationary chains $d^4$ and the diagonally-slotted gratings S, effectually disintegrating lumps of clay, earth, or gravel that would otherwise go to waste with their contained values. At the extreme lower edge of the said rocker-box B is a curved depression $b^4$, which is designed to catch and retain any possibly escaping large lumps of valuable metal, while permitting the lighter and worthless material to pass over and on to the conveyer-chute F, which by being suitably agitated, by means hereinafter explained, will pass down and to waste.

All of the material that has passed through the grating S is discharged into the rocker-box C next below the rocker-box B. The operation of this rocker-box C is similar in most respects to that of the hereinbefore-described rocker-box B. The grating S' is finer and the lower layer of chains $d^2$ are all connected to one block $b^{33}$ on one side and to a similar block $b^{33}$ on the other side, each block working in the guide-boxes $b^2$. Tension tending to pull the said blocks $b^{33}$ $b^{33}$ away from each other and keeping the said chains $d^2$ taut is obtained by means of the yokes $f'f'$, one for each block $B^{33}$, each yoke $f'$ terminating outwardly in a single threaded rod each fitted with a nut $f^2$, the threaded rod of each yoke $f'$ passing through a hole in the upper end of a spring $f^4$, whose lower part is secured to a part of the frame A. Other chains $d'$ are secured to the inside of the rocker-box C, extending from side to side approximately parallel and quite close to the lower chains $d^2$.

The grating S' in the casting that constitutes the delivery end of the rocker-box C is made finer in order to further reduce and sort the material under treatment, the said casting extending forward under the floor of the said rocker-box C and carrying, projecting downward therefrom, a stud $e^2$, whose spherical termination is suitably inclosed to form a ball-and-socket joint connected by rod $i^{48}$ to the bell-crank lever $i^2$, pivoted to an ear-plate $i^{26}$, secured to the frame A, the laterally-projecting angle of the said bell-crank lever being pivoted to the upper end of the connecting-rod $l^{21}$, which connects at its lower end with the eccentric $l^2$, secured to and operated by the shaft K.

Beneath the grating S', surrounding the openings thereof, is a box-chute $c^2$, that serves to deliver passing material into the receiving end of the flexible-bottomed box D. Projecting downward from the guide-boxes $b^2$ are bosses to which are secured the arcs $b^7 b^7$, that rest on roller-bearings Y Y, the axial lines of the rollers thereof crossing at the center of the ball-bearing O', which supports the forward end of the said rocker-box C, the said ball-bearing O' being in all respects like the ball-bearing O already described. The arcs $b^7$ can be made to perform the same functions in every way as those $b^6$, previously described.

The lower extremity of the rocker-box C is provided with a curved depression $b^5$, which serves to catch and retain metal heavier than its gangue any material passing over falling onto the agitated conveyer-chute G and by it conveyed to the tailings-dump at the rear end of the machine.

The flexible-bottomed box D is, like the two rocker-boxes B and C, supported at its higher forward end by a ball-bearing $O^2$, constructed and operated as those O and O' except that the base-plate $p^8$ is provided with a rearward extension $t^{23}$, so made as to serve as a triple bearing for the converging ends of three cone roller-shafts $t^{12}$, whose diverging ends are journaled in bearings $e^5$, secured to and supported by a bar $e^4$, which is secured to the frame A. Each shaft $t^{12}$ carries secured thereto a cone-roll T of increasing diameter toward the rear. Each shaft $t^{12}$ also carries secured thereon a disk $e^6$, located near the rearward bearings $e^5$. These disks $e^6$ serve as fenders and protect to some extent the journal-boxes $e^5$ from sand and grit. The vibratory end of the box D rests and rides on the said cone-rolls T at their largest diameter. About one-half of the length of the said box D is fitted with a flexible bottom U, of leather or other suitable material, the sag of which is supported and divided by the cone-rolls T on which the said flexible bottom U rests. The said flexible bottom U is secured to the box D at its discharge end by being clamped over the curved edge of the track of the said box D and held in place by a curved strap $b^{31}$, secured to the edge of the said track by screws, the forward edge of the said flexible bottom U, being secured to the floor proper of the said box D in any suitable manner. The lateral edges of the said flexible bottom U are also suitably secured to the sides of the said box D and then covered by plates $t'$, of suitable material, and secured by screw or bolts. The office of the plates $t'$ is twofold: to hold the flexible bottom U down at the sides and also to afford a means of securing superlying supplementary bottoms, such as cocoa matting, gunny-sacking, or other fabric suitable for the character of metal it is desired to save.

When treating ores carrying platinum-dust, it is sometimes desirable that the flexible bottom U and its superlying fabric should be operated below the surface of a tank of water, in which case a tank V is built up around the said box D, but within and secured to the frame A. Lateral vibratory movement is given to the rearward part of the box D by a stud and ball secured to the said box D, inclosed by a socket $e^3$, connected by the rod $e^{33}$ to bell-crank lever $i^3$, pivoted to ear-plates $j'$, secured to the frame A, the other angle of the said bell-crank lever $i^3$ being connected to the upper extremity of the connecting-rod $l^{22}$, whose lower end is connected to the eccentric $l^{12}$, which is secured to and operated by the shaft K.

When using matting or the like on the flexible bottom U of the box D, it is carefully removed from time to time and another substituted, the one removed being thoroughly rinsed in a tank of clear water, the fine platinum and gold dust being thus removed when the said matting is ready for reuse. Any material passing over the lower edge of the box D will fall on the separating-table H, a portion of whose bottom is fitted with a fine perforated screen $h^{56}$, of such number of mesh per inch as will be suitable for the ore being treated. The material passing through the said screen $h^{56}$ is delivered, by means of a short chute $n^{67}$, to the amalgamating-pan E.

Secured to a cross-beam of the frame A at its extreme rear end is a support consisting of a plate $q^{91}$, carrying a horizontal projection or stud $q^9$, that is fitted for and holds suspended therefrom a pendulum-rod Q and ball $q^{17}$. The said stud $q^9$ also carries suspended therefrom the bight of a chain $q^{81}$, whose ends support one end of the amalgamating-pan E, the ends of the said chain $q^{81}$ being secured at points on the rear end of the said amalgamating-pan E in any suitable manner.

The pendulum-rod Q and ball $q^{17}$ is made to vibrate by means of two springs $w^4 w^4$, one each on opposite sides of the pendulum-rod Q, to which one end of each spring $w^4$ is attached, the other end of each spring $w^4$ being attached to a reciprocating bar $w^2$, working in guides $w^5$, secured to the frame A, reciprocating movement of the said bar $w^2$ being derived from the eccentric W, connecting by the rod $w'$ with a stud-pin $w^6$, projecting from the said bar $w^2$, the said eccentric W being mounted on and secured to the counter-shaft P, which is made to revolve by a belt $b^{60}$, embracing one of the steps of the step-cone pulley $h'$, secured to the said counter-shaft P, and a corresponding step of the step-cone pulley $h^2$, secured to and operated by the shaft K.

The forward end of the amalgamating-pan E rests on a ball-bearing $O^3$, supported by gimbals, precisely similar to the ball-bearings O O', hereinbefore described, the cap-plate $n^2$ being secured to the under side of the floor of the forward part of the frame of the amalgamating-pan E, the said cap-plate $n^2$ by its depending half-boxes resting on trunnions projecting oppositely from the ball track-plate $n^4$, which rides on the balls $o^4$, that rest on the reverse track-plate $n^5$, provided with trunnions projecting oppositely but at right angles to the trunnions of the track-plate $n^4$, the trunnions of the track-plate $n^5$ resting in half-boxes projecting upwardly from the base-plate $n^3$, which is secured to a cross-beam of the frame A.

The principal part of the space between the sides of the amalgamating-pan E is occupied by a concave pan made of material suited to the chemical or other operation it is desired to perform within the said amalgamating-pan E. The depression constituting the floor of the said amalgamating-pan E is represented in the drawings as being a longitudinal cylindrical concavity in the direction of the longer dimensions of the machine; but this said concavity may be of any desired contour.

The free or vibratory end of the amalgamating-pan E is actuated through the medium of an elastic buffer composed of a plate $q^{86}$, secured to the outside end of the said amalgamating-pan E, a sliding block $m^{17}$ residing in a rectangular recess within the face of the said buffer-plate $q^{86}$, the said sliding block $m^{17}$ being maintained normally central by two springs $m^{16}$, one at each end of the said block $m^{17}$, the said springs $m^{16}$ abutting on the inside walls of the ends of the rectangular recess within which the said block $m^{17}$ works. Two parallel pins $q^{85}$ of suitable length are firmly secured to the outward face of the block $m^{17}$, which with the other parts mentioned are retained in working position by a slotted cover-plate $m^{18}$, which is kept in place by screw-bolts $h^{53}$, the slot in the said cover-plate $m^{18}$ being of sufficient width and length to permit of ample movement of the said block $m^{17}$ and pins $q^{85}$ lengthwise in the said rectangular recess. The two pins $q^{85}$ straddle the pendulum-rod Q, so that when it is caused to swing the connected end of the amalgamating-pan E is induced to swing also; but because of the yielding connection, next preceding described, of pendulum-rod Q to amalgamating-pan E the momentum of mercury or pulp, or both, within the said amalgamating-pan E is overcome with a gentle force that in the use of mercury assists in the prevention of "flouring," and in concentration such a yielding change of direction of movement contributes to the non-disturbance of the substratum of valuable heavy material previously formed. In furtherance of this desideratum the rate of vibration of the amalgamating-pan E is not dependent on the speed of the other parts of the machine, inasmuch as the belt $b^{60}$ may be shifted from one step of the step-cone pulleys $h'$ and $h^2$ to another step thereon, and thus adjust the speed of the shaft P, with its eccentric W and connections, to the rate of vibration of pendulum Q, that has been determined by raising or lowering the ball $q^{17}$ in accordance with the operator's judgment as to the proper speed for the best results upon the ore under treatment.

Any valuable mineral remaining in the sands that pass out of the amalgamating-pan E will fall onto the agitated conveyer-chute I and by it be conveyed to the concentrating-table J, which being suitably agitated and fitted with riffles of any desired form and arrangement, the form shown in Fig. 49 being transversely-placed bars $3^8$ and $3^9$ of varying lengths, separates the heavy sand from the lighter sand and delivers them separately by old and well-known methods onto the chute $c^{41}$, which being divided into two compartments by the ribs $n'$ prevents remixture of the sands that have been separated on the said table J.

The conveyer-chutes F G I and concentrating-table J are supported, maintained in position, and agitated by similar devices and means. The conveyer-chute F is on its nether side fitted with two cross-bars $r'$, placed transversely and at suitable and convenient distances from the ends of the said conveyer-chute F. The ends of the said cross-bars $r'$ project beyond the sides of the said conveyer-chute F, and each of the said projecting ends carry, secured to its under sides, the cap-bearing plate of a dumb-bell support R.

The cap-plate $r^{72}$ and the base-plate $r^{72}$ of a dumb-bell support R are precisely alike in all respects, the center of each plate $r^{72}$ being concave and serving as the socket for one of the spherical ends of the dumb-bell pin $r^{83}$, which is retained in place by a medially-bisected retaining-plate $r^{61}$ $r^{61}$, which may be kept in place by the same bolts or screws that secure the plates $r^{72}$. The use of these dumb-bell supports R for supporting the conveyer-chutes F G I and concentrating-table J permits of limited movement in a variety of directions, the limits of lateral movement being determined by the "throw" of the bell-crank levers connecting the same with the said conveyer-chutes and table J in manner hereinafter described. Longitudinally the said conveyer-chute F is maintained in proper position by a link $m'$, the forward end of which is pivoted to a cross-beam of the frame A and the rearward end of the said link $m'$ pivoted to the under side of the said conveyer-chute F, by which form of connection the said conveyer-chute F will be given a short forward jerk corresponding to the radius and arc described by the said link $m^{12}$ in its movement.

Mounted upon and secured to the shaft K are several three-way cam devices X, by which three complete in-and-out reciprocal movements are made for each revolution of the said shaft K, as will be seen by referring more particularly to Figs. 31 and 32 of the drawings herewith.

Firmly secured to the shaft K is the three-way cam $c^{47}$, its peripheral extensions acting against the parallel bars $c^{67}$ $c^{78}$, that are rigidly maintained at the proper distance from each other by the two rods $c^{56}$ $c^{56}$. The parallel bar $c^{67}$ is midway of its length constructed to form a pivoted joint with one end of a connecting-rod. The rods $c^{56}$ $c^{56}$ in addition to their service as space-bolts for the parallel bars $c^{67}$ $c^{78}$ also serve as vertical guideways $c^{89}$ $c^{91}$, one of which guideways $c^{91}$ is integral with the lower part of the journal-box $k^2$, the other guideway $c^{89}$ being integral with the upper part of the said journal-box $k^2$, and extension of the lower part of the said journal-box $k^2$ projects under a beam of the frame A, to which it is bolted. The journal-boxes $k^2$ $k^3$ $k^4$ $k^5$ being precisely similar in construction and use, the foregoing description of one suffices for the other three.

The three-way cam devices X on the shaft K are arranged in pairs in respect to the throw of the higher points on the peripheries of the said cam $c^{47}$, the connecting-rods $c^{31}$ $c^3$ being actuated by one such pair of cams $c^{47}$, set to throw in one direction at the same instant, the connecting-rods $c^{32}$ $c^{33}$ being actuated by another pair of cams $c^{47}$, both set to throw at another instant of time, the connecting-rods $c^{34}$ $c^{35}$ being actuated by another pair of cams $c^{47}$, both set to throw at another instant of time, and the connecting-rods $c^{11}$ $c^{36}$ being actuated by another pair of cams $c^{47}$, both being set to throw at another instant of time, each pair of cams $c^{47}$ "throwing" at the same instant and each pair of said cams $c^{47}$ throwing at a different moment of time from that of any of the other pairs of cams $c^{47}$.

The connecting-rod $c^{31}$ is pivoted at its lower end to the upper parallel bar $c^{67}$ and at its upper end to the laterally - projecting angle of a bell-crank lever $e^7$, pivoted to an ear-plate $e^8$, secured to the frame A. The vertical arm of the said bell-crank lever is pivoted to a short rod, whose other end is pivoted to the ear-plate $c^4$, secured to the side of the conveyer-chute F. The connecting-rod $c^3$ is pivoted at its lower end to a vertically-reciprocating parallel bar $c^{67}$, operated by a three-way cam $c^{47}$ and which is set to move in the same direction at the same instant as the next preceding described cam $c^{47}$ with its connections, the upper end of the said connecting-rod $c^3$ being pivoted to the lateral arms of a bell-crank lever $e^{10}$, pivoted to ear-plate $e^9$, secured to the frame A. The vertical arm of the said bell-crank lever $e^{10}$ is pivoted to one end of a horizontal rod $e^{12}$, whose other extremity is pivoted to an ear-plate $c^5$, secured to the under side of the conveyer-chute F.

The actuating mechanism of the conveyer-chute G is precisely similar in all respects to that of the conveyer-chute F just described, the connecting-rod $c^{32}$, connecting the cam $c^{47}$, actuating reciprocating parts, with the laterally-projecting arm of the bell-crank lever $u'$, pivoted to the ear-plate $t^3$, secured to the frame A, the vertical arm of the said bell-crank lever $u'$, pivoted to one end of a short rod, whose other end is pivoted to the ear-plate $t^2$, secured to one side of the conveyer-chute G, and the connecting-rod $c^{33}$ conjoining the reciprocating parallel bar $c^{67}$ of an actuating three-way cam $c^{47}$ with the horizontal arm of a bell-crank lever pivoted to an ear-plate $j'$, secured to the side of a beam of the frame A, the vertical arm of the said bell-crank lever being pivoted to a connecting-rod that extends under the said conveyer-chute G and there pivoted to an ear-plate secured to the under side of the said conveyer-chute G, which is supported by and rests upon dumb-bell supports R, whose base-plates are secured to and rest upon the frame A, the cap-plates of the said dumb-bell supports R being secured to the laterally-projecting bars $r^{13}$, transversely secured to the under side of the said conveyer-chute G in the same manner and for the same purpose as those $r'$ secured to the conveyer-chute F previously described.

The conveyer-chute I derives motion from three-way cam devices X through pivoted connecting-rods $c^{34}$ and $c^{35}$ to bell-crank levers $i^6$ $i^6$, pivoted to ear-plates $t^{21}$ $t^{21}$, secured to the frame A, the said bell-crank levers $i^6$ $i^6$ transforming the vertical movement of the rods $c^{34}$ $c^{35}$ to the lateral movement required by the said conveyer-chute I, which is provided with ear-plates $j^2$ $j^2$, secured to one side thereof and pivoted to and with horizontal rods connecting the said bell-crank levers $i^6$ $i^6$ to and with the said ear-plates $j^2$ $j^2$ in the manner and performing functions precisely similar to the connections of the conveyer-chutes F and G previously described. Cross-bars $r^{13}$ $r^{15}$ are provided and secured to the nether side of the said conveyer-chute I, the end of the said cross-bars $r^{13}$ $r^{15}$ projecting beyond the sides of the said conveyer-chute I and carrying secured to each said projecting ends on the under sides thereof cap-plates $r^{72}$ of the dumb-bell supports R, each with its pin $r^{83}$ and base-plate $r^{72}$ secured to the frame A. A link $m^{14}$, pivoted by one end to the frame A and by the other to the under side of the conveyer-chute I, maintains the said conveyer-chute in its proper longitudinal position. On the floor of the said conveyer-chute I is a guide-dam $g^{41}$, which may be so placed as to direct the descending pulp upon the concentrating-table J at one side or the other, as desired.

The separating-table H is supported and agitated differently from the chutes and table already described, in that the dumb-bell supports R are placed at the longitudinal middle of the said separating-table H, each said dumb-bell support R being set on and secured to cross-beams of the frame A, suitably located to properly balance the said separating-table H, secured to the under side of which is a projecting lever $a^3$, the projecting end of which is fitted for and pivoted to the topmost end of a short rod $c^{37}$, whose lower end is pivoted to one of the parallel bars $c^{67}$ of the three-way cam-movement X on the shaft K. This particular three-way cam-movement X performs double duty, in that the rod $c^{37}$ above and the rod $c^{35}$ below are each actuated by the one three-way cam-movement X, the lower parallel bar being a duplicate of the upper parallel bar, having pivoted connection with the rod $c^{37}$ as well as with the rod $c^{35}$.

When using the dumb-bell supports R in place of the roller-supports Y and arcs $b^6$ or $b^7$, the synclinal or anticlinal arcs it is desired to be described by the free ends of the rocker-boxes B or C may be determined by the angle at which the dumb-bell pins $r^{83}$ are placed under the said rocker-boxes B or C.

When it is desired that any of the dumb-bell supports R shall serve as studs immovable at bottom, the half-plate $r^{61}$ on the base-plates $r^{72}$ of the said dumb-bell supports R are made to fit and press so tightly on the lower spherical ends of such dumb-bell pins $r^{83}$ as are desired to rigidly remain in a fixed position.

Having thus described the parts of my invention in detail, the practical workings of the same would be: that material to be treated is first introduced into rocker-box B, together with enough water to make it free-moving where it receives the action of said rocker-box, and any lumps of clay or cemented material is caught and disintegrated by the shearing action of the chains $d^3$ and $d^4$. The coarser particles and waste material are carried off to the tailings-dump through chute F. The finer particles drop through the gratings $s$ of the rocker-box B into box C, where they receive the action of box C and the chains $d'$ and $d^2$, and where another separation is made any particles of valuable metal too large to pass through the gratings, and yet having more specific gravity than the waste, would be caught in the pocket $b^5$, and the waste passing off through chute G to the tailings-dump, the finer particles passing through the gratings $s'$ in the bottom of box C into box D, where they receive the action of that box and its flexible bottom, the particles having the greater specific gravity being caught in the coarse fabric, such as matting, which matting is from time to time removed to be cleaned and another piece put in its place while the first is being rinsed in clear water, when it can be again used, the coarser material and that having less specific gravity passing over the flexible bottom onto a separating-table H, where it is sized by screens in the floor of this table, and passing from there through chute $n^{67}$ to the amalgamating-pan E, where amalgamation takes place by using mercury. If found necessary to secure the results desired from the material under treatment, other chemicals may be used in the said pan E, the tailings passing from the amalgamating-pan E into the agitated conveyer-chute I to be conveyed to the concentrating-table J, where the final separation of such particles of material as have but a slight difference in their specific gravity is made by the riffles, the tailings passing to the tailings-dump through chute $c^{41}$ and to waste.

Some ores can be successfully treated by one or two of the separating devices of this invention, and other ores and material require all of them. The order, as shown, in which the different devices are used need not be followed; but they may be transposed—that is, that the amalgamating-pan E may be used before box D or after the concentrating-table J, as required, to better treat the material, some ores responding more readily to one treatment than another.

Having thus described my invention, I claim and desire to secure by Letters Patent—

1. In combination with a metal-saving machine, a power-driven shaft and an eccentric attached to one end of the connecting-rod, the other end of which is pivoted to the lateral arm of a bell-crank lever, a laterally-actuated box supported on the frame provided with grate-openings in its floor, above and near which, are one or more transversely-disposed chains, each maintained elastically taut and stationary by means of connections at the end of each of said chains, with resilient supports secured to the frame of the machine; the vertical arm of the bell-crank lever pivoted to one end of a short connecting-rod, the other end of said rod secured to the said box, substantially as shown and set forth.

2. In a machine for separating metal from its gangue, a frame provided with bearings carrying a power-driven shaft with an operating-eccentric, and a connecting-rod pivoted to the lateral arm of a bell-crank lever, the vertical arm of which is pivoted to one end of a short rod inclosing a spherical stud secured to a rocker-box capable of being reciprocally actuated and having a perforated floor over which, and in juxtaposition therewith, one or more resiliently-stationary chains are transversely disposed, the said chains being connected at each end with blocks loosely filling corresponding holes in each side of the said rocker-box, the exterior ends of each of the said blocks connected to rods whose outer ends are threaded and provided, each, with a nut by which connections and tension is maintained with springs secured to a stationary part of the frame of the machine in combination with other chains arranged adjacently over the said resiliently-stationary chains but secured to and moving with the inside of the said rocker-box to which the end of the said adjacent chains are attached, substantially as and for the purpose hereinbefore described.

3. In a machine for saving gold and platinum from gangue, the combination of a rocker-box pivoted at its higher end in such a manner as to admit of tilting in any direction, and actuated by a power-driven shaft with an operating-eccentric, and a connecting-rod pivoted to the lateral arm of a bell-crank lever, the vertical arm of which is pivoted to one end of a short rod, the other end of said rod inclosing a spherical stud secured to the said rocker-box, and provided, one on each side, with opposing laterally-projecting curved supporting-arms that rest and ride on bearing-rolls whose axial lines are coincident with radial lines from the center of the pivoted bearing supporting the higher end of the said rocker-box, with a series of chains stretched between springs secured to opposite stationary parts of the frame of the machine, the said series of chains superposed over gratings in the floor of the said rocker-box, other chains being secured to the inner sides of the said rocker-box and disposed approximately parallel and adjacent to the said resiliently-stationary chains, as and for the purpose substantially as described.

4. In a machine for saving gold and platinum from gangue, a box consisting of a bottom, one upwardly-projecting end and two sides, the floor of the said bottom composed in part of flexible material, the sag of which rests on radially-disposed rolls converging toward a centrally-placed bearing supporting the higher end of the said box, the said bearing secured to the under side of the said box and to the frame of the machine in such a manner as to permit of rotative movement of the said box in the plane of its bottom and of that of the top lines of the said radially-disposed rolls whose said converging ends are journaled in bearings secured to a part of the said frame of the machine, the lower end of the said box caused to laterally vibrate by a power-driven shaft, with an operating-eccentric, and a connecting-rod pivoted to the lateral arm of a bell-crank lever, the vertical arm of which is pivoted to one end of a short rod, the other end of said rod inclosing a spherical stud secured to the said rocker-box, substantially as and for the purpose shown.

5. In a machine for recovering gold or platinum from its associated gangue, the combination of a box consisting of three upwardly-extending sides secured to a bottom consisting in part of flexible material, the sag of which rests on and is supported by, a number of radially-disposed conical rolls whose peripheral longitudinal lines and axes converge toward the pivotal bearing supporting the higher end of the said box, the said rolls journaled at their converging ends to a bearing secured to the frame of the machine, and at their diverging ends journaled to bearings secured to a cross-bar secured to the said frame of the machine, the said box provided on its two opposite, inner sides, each, with a detachable plate which serves as a clamp for detachably securing the opposite edges of supplementary superlying removable flexible bottoms, the free end of the said box being laterally vibrated by a power-driven shaft with an operating-eccentric, and a connecting-rod pivoted to the lateral arm of a bell-crank lever, the vertical arm of which is pivoted to one end of a short rod, the other end of said rod inclosing a spherical stud secured to the said rocker-box, substantially as described.

6. In a machine for winning gold and platinum from gangue, a box supported at its higher part by a pivotal bearing connecting the said box with the frame of the machine in such a manner as to permit the free end of the said box to swing laterally, the extreme free end of the said box carrying a curved bar on the arc of a circle, whose radius is the center of the said pivotal bearing, the said curved bar provided on its peripheral edge with a clamp-strip of the same contour, and detachably secured by screws to the said peripheral edge in such a manner as to securely clamp and hold one edge of a flexible sheet whose other edges are secured to inside parts of the said box, a part of whose floor is cut away and substituted by the said flexible sheet, the sag of which is supported and divided by a number of conical rolls whose axes meet at the center of the said pivotal bearing, the converging ends of the axles of the said conical rolls journaled in a bracket secured to the frame of the machine, the diverging ends of the axles of the said rolls journaled in bearings secured to a bar constituting a part of the frame of the machine, the rearward part of each conical-roll axle, immediately forward of its bearing, carrying secured thereto a fender-disk that protects the bearing behind, a power-driven shaft with an eccentric, and a connecting-rod pivoted to the lateral arm of a bell-crank lever, the vertical arm of which is pivoted to the end of the short rod, the other end of said rod inclosing a spherical stud secured to the said rocker-box, substantially as shown and set forth.

7. In a machine for winning gold and platinum from gangue, in combination with a power-driven shaft with an operating-eccentric, and a connecting-rod pivoted to the lateral arm of a bell-crank lever, the vertical arm of which is pivoted to one end of a short rod, the other end of said rod inclosing a spherical stud secured to an inclined, three-sided box pivoted at its higher under side to a median central bearing secured to, and supported by, the frame of the machine, the free end of the said box provided with suitable mechanism for causing it to be laterally vibrated, the said free end of the said box resting and riding on a number of rolls that are radial with the center of the said rolls journaled in a bracket secured to the frame of the machine, the diverging ends of the said rolls journaled in bearings secured to a cross-bar of the frame of the machine, the rearward part of the bottom of the said box consisting of flexible material suitably secured by its edges to the said box, the sag of the said flexible material riding on and divided by the said radially-disposed rolls, the said box, central bearing, rolls and flexible bottom operating below the top level of a tank that may be filled with water with or without chemicals, substantially as and for the purpose shown and described.

8. In a machine for winning metal from gangue, a separating-table whose floor is bounded on three sides by upwardly-extending walls, the said floor supported by two dumb-bell supports located longitudinally median, near the nether end of the said separating-table, the base-plates of the said dumb-bell supports secured to a cross-beam of the frame of the machine, a perforated screen secured and located over a box-chute that is arranged to discharge into another metal-saving device below, the said separating-table terminating, at its lower end, in a bifurcated waste-chute for carrying to waste all material too coarse to pass through the holes in the said perforated screen, the sides of the said separating-table made to vibrate vertically by means of a transverse bar secured to the under side of the said separating-table and projecting beyond one of the sides of the said separating-table and connecting with the top end of a vertical rod whose lower end terminates by a pivoted connection with one of a connected pair of parallel bars between which is a three-way cam secured to the longitudinally-journaled and frame-supported shaft which derives rotary motion from a bevel gear-wheel secured to one end thereof, the said bevel gear-wheel having teeth that intermesh with a bevel-pinion secured to one end of a transversely-journaled, frame-supported driving-shaft carrying secured thereon a balance-wheel and driving-pulley, the rotation of the said three-way cam giving three equal, up-and-down movements to the said parallel bars and connected separating-table for each revolution of the said longitudinal shaft, substantially as described.

9. In a machine for winning metal from gangue, an amalgamating-pan pivoted near its lower, discharge, end to a ball-bearing, the two track-plates of which are each oppositely trunnioned and mounted at right angles to each other, one journaled to a ball-bearing frame secured to the under side of the said amalgamating-pan, the other said track-plate having its oppositely-projecting trunnions disposed at right angles to those of the adjacent track-plate above and separated by a series of balls working in an annular groove in each said track-plate, the opposite trunnions of the lower said track-plate journaled in half-box bearings projecting upward from the ball-bearing base-plate frame which is secured to a cross-beam of the frame of the machine, the higher, swinging end of the said amalgamating-pan supported by a chain whose ends are secured, each, near opposite corners of the said amalgamating-pan, the middle of the said chain forming an apex to which connection is made to a sleeve inclosing and working on a stud projecting from the frame of the machine, the said stud also carrying pivoted thereto the upper extremity of a pendulum-rod whose lower part carries a ball adjustable vertically thereon and secured by a set-screw, the said pendulum-rod being embraced by two pins projecting from a resiliently-secured block inclosed within a box-base secured to the rear end of the said amalgamating-pan the floor of which is cylindrically concave in the direction of the length of the machine, the free end of the said amalgamating-pan caused to swing with the said pendulum-rod by its already-described resilient block with its two projecting pins embracing the said pendulum-rod to which a vibrating movement is given by means of a coiled spring secured at its middle to the said pendulum-rod the ends of the coiled spring secured to a sliding bar working transversely in ways secured to the frame of the machine, the said sliding bar pivoted to one end of a connecting-rod, the other end of the said connecting-rod being connected to the strap of an eccentric secured to and mounted on a counter-shaft journaled at each end in bearings secured to the frame of the machine, the said counter-shaft also carrying secured thereto a step-cone pulley operated by a belt driven by a reversely-placed step-cone pulley secured to and revolving with the suitably-driven longitudinal shaft journaled in bearings secured to the said frame of the machine, substantially as herein shown and set forth.

CHARLES O. MICHAELSEN.

Witnesses:
RAM RANEY,
WILLIAM BROADBENT